United States Patent
Watanabe

(10) Patent No.: US 9,221,307 B2
(45) Date of Patent: Dec. 29, 2015

(54) PNEUMATIC TIRE

(75) Inventor: Takeshi Watanabe, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 315 days.

(21) Appl. No.: 12/990,549

(22) PCT Filed: Apr. 28, 2009

(86) PCT No.: PCT/JP2009/058363
§ 371 (c)(1),
(2), (4) Date: Dec. 10, 2010

(87) PCT Pub. No.: WO2009/133892
PCT Pub. Date: Nov. 5, 2009

(65) Prior Publication Data
US 2011/0094646 A1 Apr. 28, 2011

(51) Int. Cl.
*B60C 15/00* (2006.01)
*B60C 15/024* (2006.01)
*B60C 13/02* (2006.01)
*B60C 3/04* (2006.01)
*B60C 17/00* (2006.01)

(52) U.S. Cl.
CPC . *B60C 13/02* (2013.01); *B60C 3/04* (2013.01); *B60C 15/0242* (2013.04); *B60C 17/0009* (2013.04)

(58) Field of Classification Search
CPC .... B60C 15/00; B60C 15/024; B60C 15/0242
See application file for complete search history.

(56) References Cited

U.S. PATENT DOCUMENTS

| 3,372,726 A | 3/1968 | Sidles |
| 5,107,915 A * | 4/1992 | Shimomura et al. .......... 152/543 |
| 8,002,530 B2 * | 8/2011 | Hiroishi ...................... 425/28.1 |
| 2009/0032161 A1 | 2/2009 | Yamaguchi |

FOREIGN PATENT DOCUMENTS

| EP | 2020311 | * | 2/2009 |
| EP | 2 055 507 A1 | | 5/2009 |
| JP | 2000-313209 A | | 11/2000 |
| JP | 2006-76431 A | | 3/2006 |
| JP | 2008-1353 | * | 1/2008 |
| JP | 2008-068716 A | | 3/2008 |
| JP | 2008-222006 A | | 9/2008 |
| WO | 2007/032405 A1 | | 3/2007 |
| WO | 2009/017165 A1 | | 2/2009 |

OTHER PUBLICATIONS

International Search Report dated Jul. 7, 2009 (4 pages).
(Continued)

*Primary Examiner* — Justin Fischer
(74) *Attorney, Agent, or Firm* — Sughrue Mion, PLLC

(57) ABSTRACT

The characteristic of the present invention is a pneumatic tire comprising a plurality of radial protrusions 60 each extending in a tire radial direction on a tire surface 31 and having a shape protruding from the tire surface outward in a tire width direction, wherein the plurality of radial protrusions 60 are provided radially with a tire rotation axis S as a center, the plurality of radial protrusions 60 each have an outer end portion 62 being an end portion located on an outer side in the tire radial direction, and the outer end portion 62 is provided to the tire surface in a tire maximum width portion (a maximum width portion T) in the tire width direction.

10 Claims, 16 Drawing Sheets

(56) References Cited

OTHER PUBLICATIONS

European Search Report issued in European Application No. 09738829.2 dated Apr. 27, 2011.

Korean Office Action dated Apr. 5, 2012 in the corresponding Korean Patent Application No. 10-2010-7024505, English Translation.

* cited by examiner

PNEUMATIC TIRE

TECHNICAL FIELD

The present invention relates to a pneumatic tire provided with multiple radial protrusions extending in a tire radial direction on a tire surface thereof.

BACKGROUND ART

Generally, a rise in the temperature of a pneumatic tire promotes a time-dependent change in a material constituting the pneumatic tire. An example of the time-dependent change in the material is a change in properties. The temperature rise in the pneumatic tire can also cause damage in a tread portion at high-speed driving. For those reasons, the temperature rise in the pneumatic tire is not desirable in terms of the durability of the pneumatic tire.

An improvement in the durability is important particularly for an off-the-road radial tire (ORR) and a truck and bus radial tire (TBR) that receive a heavy load, as well as a run-flat tire running flat (running with a tire internal pressure of 0 kPa). Accordingly, it is important for these pneumatic tires to have a reduced temperature rise.

For example, the run-flat tire is provided with sidewall reinforcing layers for reinforcing tire side portions. The sidewall reinforcing layers each have a crescent shape in a cross section taken in a tire width direction. When the run-flat tire runs flat, deformation in a tire radial direction concentrates on the sidewall reinforcing layers. Thereby, the sidewall reinforcing layers have an increased temperature, consequently deteriorating the durability of the run-flat tire.

On the other hand, there has been proposed a technique in which reinforcing members for suppressing deformation of the pneumatic tire are provided to a carcass layer and bead portions (called a first technique below) (e.g., Patent Literature 1). In the first technique, the reinforcing members for suppressing deformation in side portions are provided particularly to the carcass layer and the bead portions that constitute the tire side portions. Thereby, the temperature rise in the pneumatic tire, or particularly, the temperature rise in the tire side portions can be suppressed.

There is known a technique in which a rim guard having many ridges is provided outside, in the tire width direction, of each bead portion adjacent to a rim (called a second technique below). The surface area of the pneumatic tire is increased by the many ridges provided to the rum guard, improving the radiation performance of heat generated in the pneumatic tire.

Citation List

Patent Literature

Patent Literature 1: Japanese Patent Application Publication No. 2006-76431

SUMMARY OF INVENTION

In the first technique described above, a load applied to the pneumatic tire might lead to a separation of the reinforcing members. In other words, the reinforcing member might be a factor for other damage.

Moreover, the reinforcing members provided to the tire side portions improve the rigidity of the tire side portions, and therefore make the pneumatic tire more bouncy. This consequently might degrade the steering stability, ride quality, and the like. The run-flat tire, in particular, has high rigidity in the tire side portions; therefore, the ride quality and the like might be degraded.

As described, the intention of the second technique described above is to improve the radiation performance by increasing the surface area of the pneumatic tire. Meanwhile, the outer surface of the pneumatic tire is preferably made of a rubber material having low heat conductivity such as to prevent conduction of friction heat generated between the pneumatic tire and the road surface. Accordingly, the temperature rise in the tire side portions cannot be sufficiently suppressed by simply increasing the surface area of the pneumatic tire.

The present invention has been made to solve the above problems, and has an objective of providing a pneumatic tire capable of sufficiently suppressing the temperature rise in the tire side portions.

To solve the above problems, the present invention has the following aspects. The first aspect of the present invention is summarized as a pneumatic tire comprising a plurality of radial protrusions (radial protrusions 60) each extending in a tire radial direction on a tire surface (tire surface 31) and having a shape protruding from the tire surface outward in a tire width direction, wherein the plurality of radial protrusions are provided radially with a tire rotation axis as a center, the plurality of radial protrusions each have an outer end portion (outer end portion 62) being an end portion located on an outer side in the tire radial direction, and the outer end portion is provided to the tire surface in a tire maximum width portion (maximum width portion T) in the tire width direction.

According to the above aspect, the pneumatic tire has the multiple radial protrusions protruding from the tire surface outward in the tire width direction. Accordingly, airflow flowing on the tire side portion (the tire surface) crosses over the radial protrusion. Then, the airflow flows toward the tire surface in the direction substantially perpendicular thereto at a position behind the radial protrusion in the tire rotation direction, and then collides heavily with the tire surface. Consequently, the airflow and the tire surface actively exchange heat with each other, sufficiently suppressing the temperature rise in the tire side portion (tire surface). This, as a result, improves the durability of the tire.

Here, assume that the outer end portions of the radial protrusions are provided outside the maximum width portion in the tire radial direction. In this case, if the tire side portions are deformed when the pneumatic tire runs flat (runs with a tire internal pressure of 0 kPa), the radial protrusions come in contact with the road surface. As a result, the radial protrusions suffer from friction heat, increasing the temperature in the tire side portion. Moreover, friction between the radial protrusions and the road surface might chip or remove the radial protrusions. This consequently lowers the visibility for the pneumatic tire.

With this taken into consideration, the outer end portions are provided in the maximum width portion. Accordingly, even if the tire side portions are deformed when the pneumatic tire runs flat (runs with a tire internal pressure of 0 kPa), the radial protrusions do not come in contact with the road surface. As a result, the radial protrusions do not suffer from friction heat, sufficiently suppressing the temperature rise in the tire side portion (the tire surface). In addition, since the radial protrusions are not chipped or removed, the visibility for the pneumatic tire 1 is not lowered.

The other aspect is summarized that a width of the tire maximum width portion measured in the tire radial direction is within a range of 10 mm on each of outer and inner sides, in the tire radial direction, of a tire maximum width point.

The other aspect is summarized as further comprising a circular circumferential protrusion extending along a circumference which has the tire rotation axis as a center and having a shape protruding outward in the tire width direction, wherein the circular circumferential protrusion is provided in the tire maximum width portion.

The other aspect is summarized that a height of the circular circumferential protrusion measured in the tire width direction is 0.2 times to 1.5 times, both inclusive, of a maximum height of each of the plurality of radial protrusions measured in the tire width direction.

The other aspect is summarized that a width of the circular circumferential protrusion measured in the tire radial direction is 2 mm to 22 mm, both inclusive.

The other aspect is summarized that the outer end portion has an end face on the outer side in the tire radial direction, and the end face forms an angle larger than 0° but not exceeding 90° with respect to the tire surface.

The other aspect is summarized that a height of the outer end portion measured in the tire width direction decreases toward the outer side in the tire radial direction.

The other aspect is summarized that the plurality of radial protrusions have a relation of $1.0 \leq p/h \leq 50.0$ and $1.0 \leq (p-w)/w \leq 100.0$, where "h" is a maximum height of each radial protrusion measured in the tire width direction, "w" is a width of each radial protrusion measured in a direction perpendicular to the tire radial direction, and "p" is a pitch between the adjacent radial protrusions.

The present invention can provide a pneumatic tire capable of sufficiently suppressing the temperature rise in the tire side portions.

DESCRIPTION OF EMBODIMENTS

Examples of a pneumatic tire according to the present invention will be described with reference to the drawings. Note that, in the following description of the drawings, same or similar reference signs denote same or similar elements and portions.

In addition, it should be noted that the drawings are schematic and ratios of dimensions and the like are different from actual ones. Therefore, specific dimensions and the like should be determined in consideration of the following description. Moreover, the drawings also include portions having different dimensional relationships and ratios from each other.

[First Embodiment]
(Configuration of a Pneumatic Tire)

Figure 1:
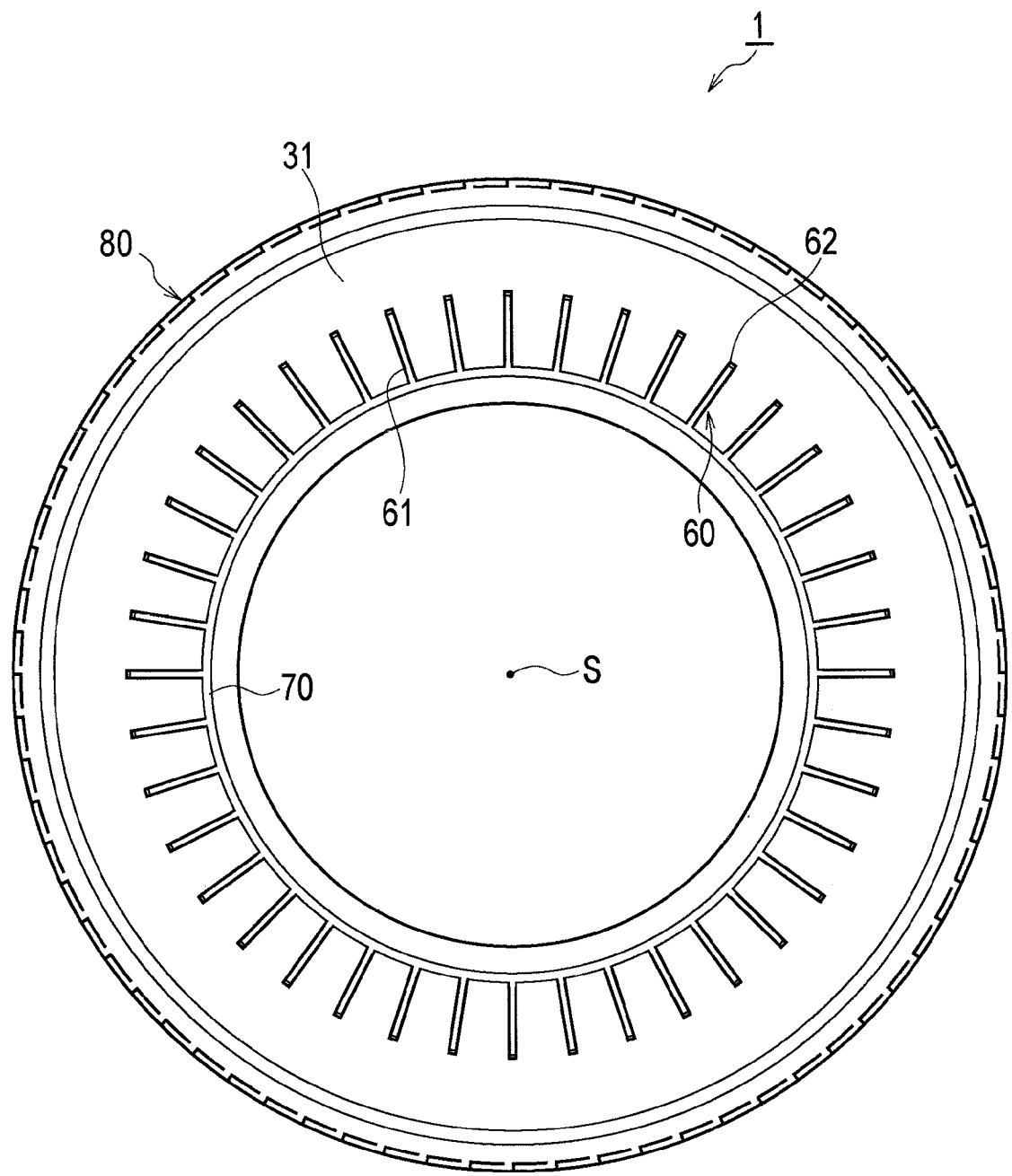
FIG. 1 is a side view of a pneumatic tire according to a first embodiment.
Figure 2:
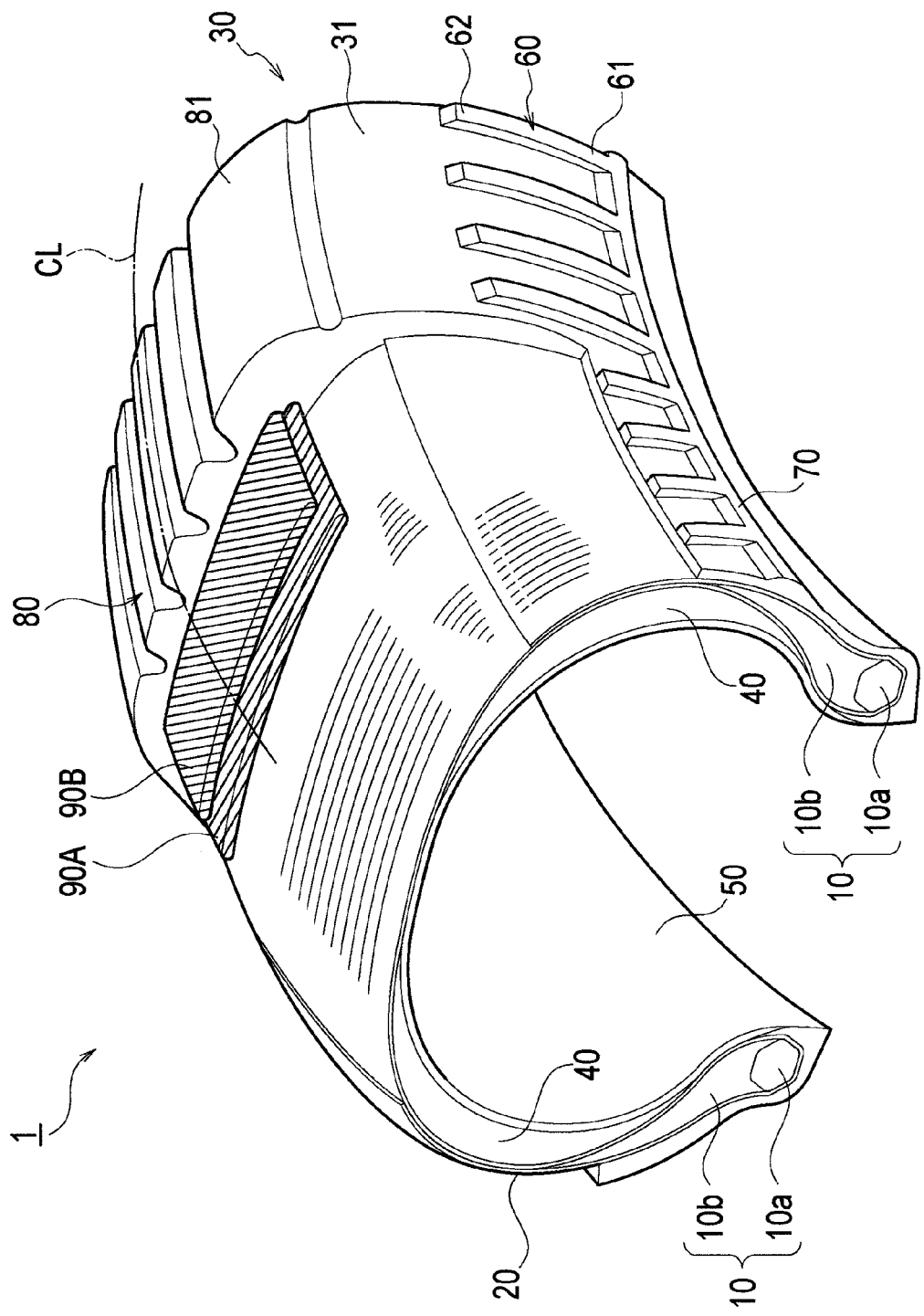
FIG. 2 is a partial cross-sectional perspective view of the pneumatic tire according to the first embodiment.
Figure 3:
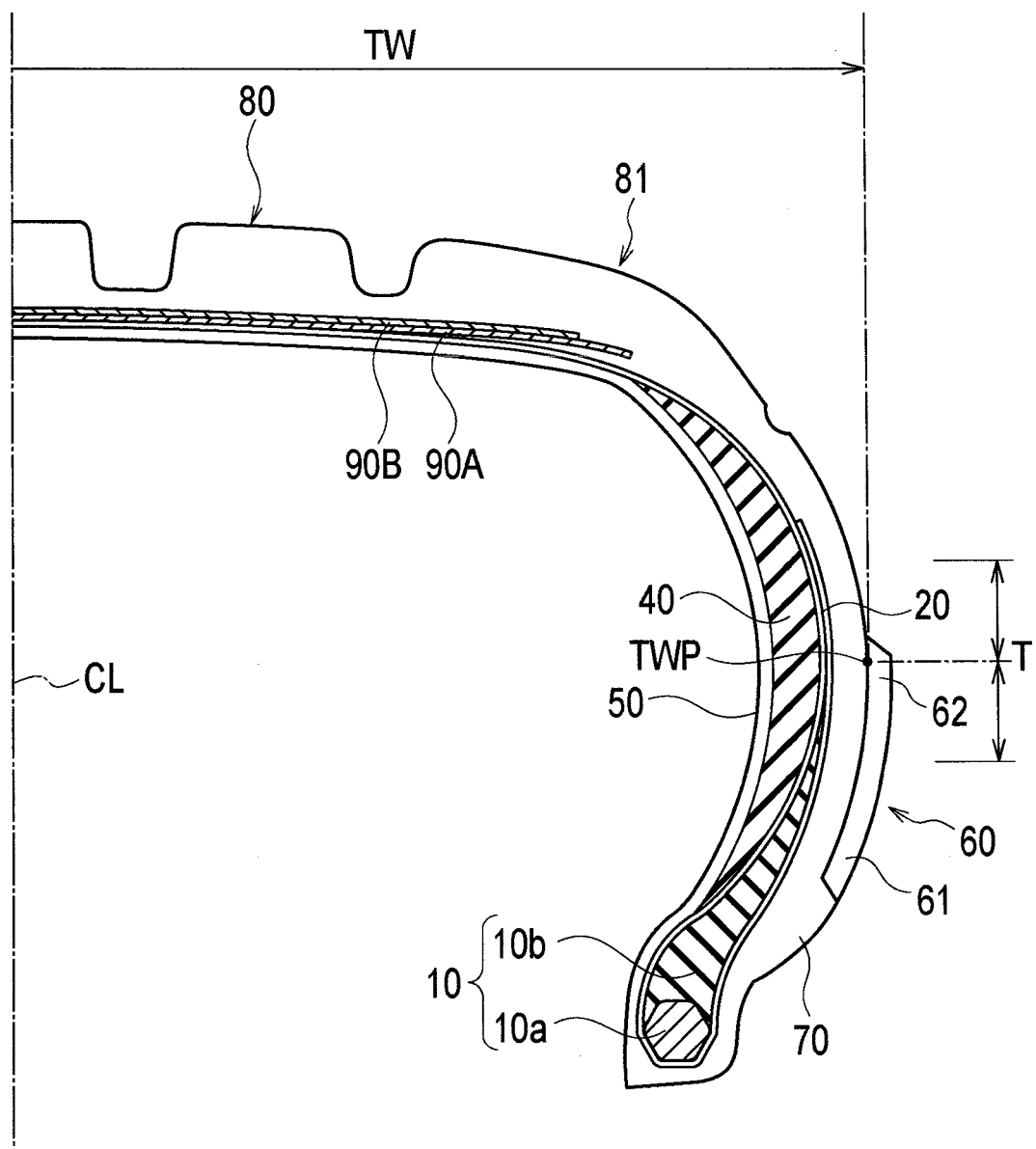
FIG. 3 is a cross-sectional view of the pneumatic tire according to the first embodiment, taken in a tire width direction.

First, the configuration of a pneumatic tire according to a first embodiment is described with reference to the drawings. FIG. 1 is a side view of the pneumatic tire according to the first embodiment. FIG. 2 is a partial cross-sectional perspective view of the pneumatic tire according to the first embodiment. FIG. 3 is a cross-sectional view, taken in a tire width direction, of the pneumatic tire according to the first embodiment.

As FIGS. 1 to 3 show, a pneumatic tire 1 includes paired bead portions 10 and a carcass layer 20. The paired bead portions 10 each include at least a bead core 10a and a bead filler 10b. In the tire width direction, the carcass layer 20 is provided between the paired bead cores 10a to make a toroidal shape and is folded from an inner side, in the tire width direction, of each bead core 10a to an outer side, in the tire width direction, of the bead core 10a along the outer circumference of the bead core 10a.

In a cross section taken in the tire width direction, crescent-shaped side reinforcing layers 40, made of rubber stock, are provided on an inner side of the carcass layer 20 to reinforce tire side portions 30, respectively. Note that each tire side portion 30 is provided between one of edge portions, namely tread shoulders 81, of a tread portion 80 to be described later and the corresponding bead portion 10.

An inner liner 50 is provided on an inner side, in the tire width direction, of the side reinforcing layers 40. The inner liner 50 is a rubber layer corresponding to a tube and having high airtightness. Radial protrusions 60 extending straight in a tire radial direction are provided on an outer side, in the tire width direction, of each of the carcass layer 20, namely, on a surface of each of the tire side portions 30 (called a tire surface 31 hereinbelow). The radial protrusions 60 each have a shape protruding from the tire surface 31 outward in the tire width direction. The multiple radial protrusions 60 are provided radially with a tire rotation axis S as the center. Note that details of the radial protrusions 60 will be described later.

A rim guard 70 is provided on an outer side, in the tire width direction, of the carcass layer 20 near the corresponding bead portion 10. The rim guard 70 has a shape protruding from the tire surface 31 outward in the tire width direction.

The tread portion 80 to be in contact with a road surface is provided on an outer side, in the tire radial direction, of the carcass layer 20. Between the carcass layer 20 and the tread portion 80, a first belt layer 90A and a second belt layer 90B are provided on an inner side in the tire radial direction and on an outer side in the tire radial direction, respectively.

(Configuration of the Radial Protrusions)

Figure 4:
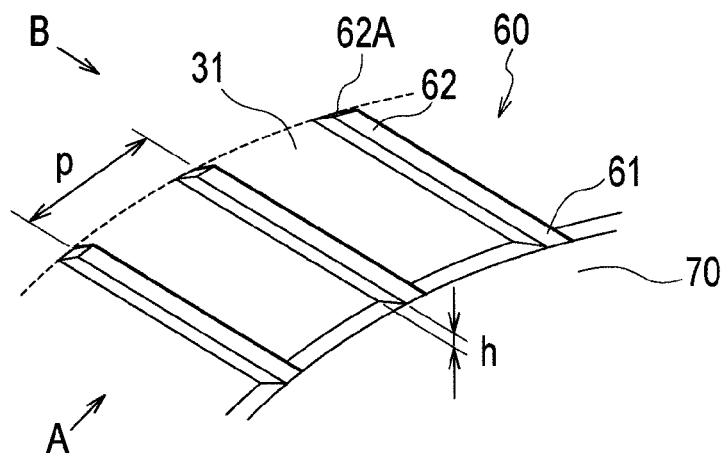
FIG. 4 is a perspective view of radial protrusions according to the first embodiment.
Figure 5A:
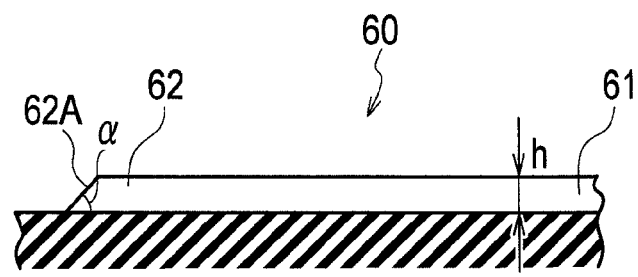
FIG. 5 is a diagram of radial protrusions according to the first embodiment.
Figure 5B:
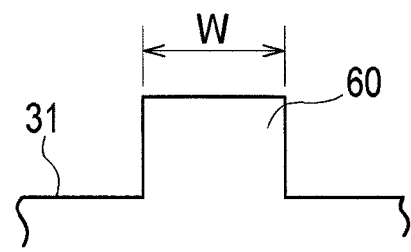

Next, the configuration of the radial protrusions 60 described above is described with reference to the drawings. FIG. 4 is a perspective view of the radial protrusions according to the first embodiment. FIG. 5 shows the radial protrusion according to the first embodiment.

Part (a) of FIG. 5 is a diagram, viewed in the direction of Arrow A in FIG. 4, showing the radial protrusion according to the first embodiment. Part (b) of FIG. 5 is a diagram, viewed in the direction of Arrow B in FIG. 4, showing the radial protrusion according to the first embodiment.

As FIGS. 4 and 5 show, each of the multiple radial protrusions 60 is formed to be substantially rectangular in a cross section taken in a direction substantially perpendicular to the tire radial direction (i.e., to the extending direction of the protrusion). The multiple radial protrusions 60 each have an inner end portion 61 being an end portion located at an inner side thereof in the tire radial direction and an outer end portion 62 being an end portion located at an outer side thereof in the tire radial direction.

The inner end portion 61 continues smoothly into the surface of the rim guard 70. The outer end portion 62, on the other hand, inclines to smoothly continue into the tire surface 31. The outer end portion 62 is provided in a portion corresponding to a tire maximum width TW (called a maximum width portion T hereinbelow) in the tire surface 31.

The maximum width portion T refers to an area extending from a point 10 mm away from a point TWP corresponding to the tire maximum width TW toward an inner side in the tire radial direction to a point 10 mm away from the point TWP toward an outer side in the tire radial direction (see FIG. 3). Since the outer end portions 62 are provided in this area, even if the tire side portions 30 are deformed when the pneumatic tire 1 runs flat (runs with a tire internal pressure of 0 kPa), the radial protrusions 60 do not come in contact with the road surface. As a result, the radial protrusions 60 do not suffer from friction heat, and therefore the temperature rise in the tire side portions 30 can be suppressed.

The outer end portion 62 has an end face 62A at an outer side in the tire radial direction. The end face 62A inclines ($\alpha$) with respect to the tire surface 31. Specifically, the height of the outer end portion measured in the tire width direction decreases toward an outer side in the tire radial direction. In other words, the angle formed between the end face 62A and the tire surface 31 is constant.

The maximum height of each radial protrusion 60 measured in the tire width direction (called a radial-protrusion height h hereinbelow) is preferably 0.5 mm to 7 mm, both inclusive.

When the radial-protrusion height h is 0.5 mm or larger, airflow crosses over the radial protrusion 60 and flows toward the tire surface 31 in a direction substantially perpendicular thereto. Such airflow flowing toward the tire surface 31 in the direction substantially perpendicular thereto (so-called downflow) collides heavily with the tire surface 31 at a position between the radial protrusions 60, allowing the airflow and the tire surface 31 to actively exchange heat with each other. Thereby, the temperature rise in the tire side portion 30 can be efficiently suppressed. On the other hand, when the radial-protrusion height h is 7 mm or smaller, the radial protrusions 60 can be provided with enough rigidity. This can further improve the durability of the radial protrusions 60.

The width of each radial protrusion 60 measured in a direction substantially perpendicular to the tire radial direction (to the extending direction of the protrusion) (called a radial-protrusion width w) is constant in the tire radial direction. The radial-protrusion width w is preferably 0.3 mm to 4 mm, both inclusive.

When the radial-protrusion width w is 0.3 mm or larger, the radial protrusions 60 can be provided with enough rigidity. Thereby, the durability of the radial protrusions 60 can be further improved. On the other hand, when the radial-protrusion width w is 4 mm or smaller, the internal temperature of (the temperature of heat accumulated in) the radial protrusions 60 can be decreased. Thereby, the temperature rise in the tire side portion 30 can be efficiently suppressed.

Figure 6:
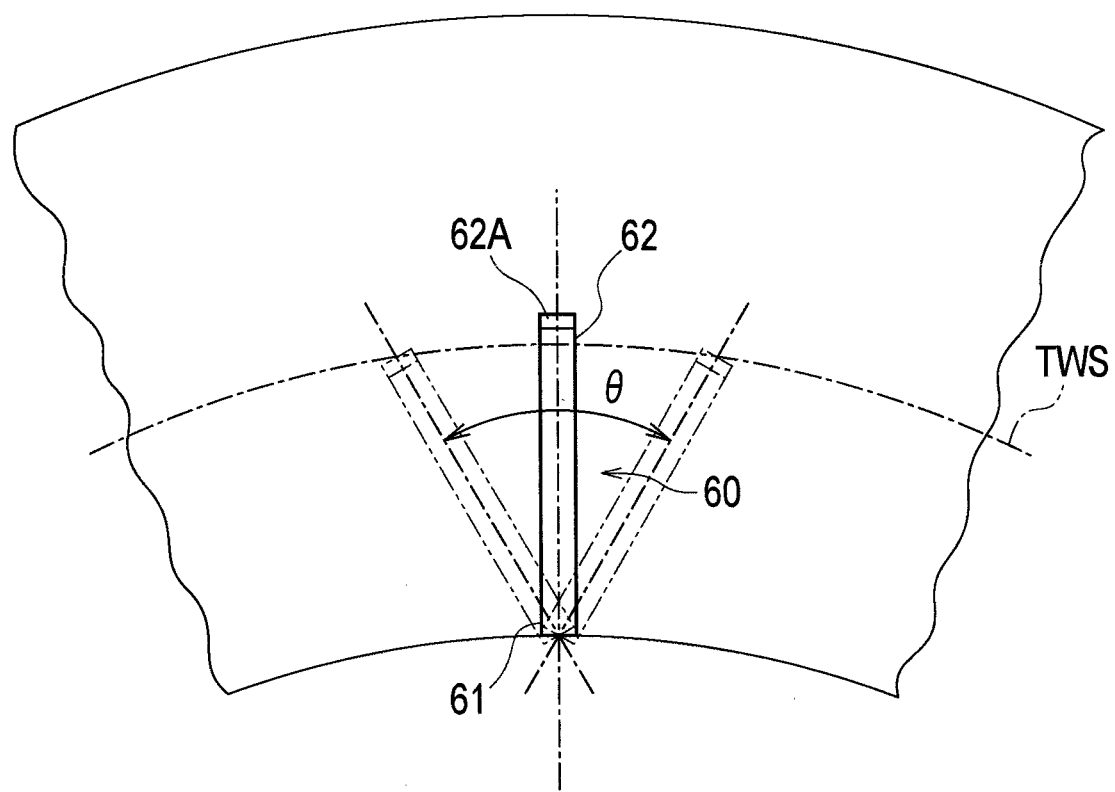
FIG. 6 is an enlarged side view of the radial protrusion according to the first embodiment.

Next, with reference to a drawing, the extending direction of the radial protrusions 60 is described. FIG. 6 is an enlarged side view of the radial protrusion according to the first embodiment.

As FIG. 6 shows, an angle between the tire radial direction and the direction in which the radial protrusion 60 extends (an extending-direction angle $\theta$) is preferably set within a range of $-70° \leq \theta \leq 70°$.

When the extending-direction angle ($\theta$) is set within the above range, airflow flowing toward the tire surface 31 in the direction substantially perpendicular thereto (so-called downflow) is generated at a position behind (downstream of) the radial protrusion 60 in a tire rotation direction. As a result, the temperature rise in the tire side portion 30 can be efficiently suppressed.

Figure 7:
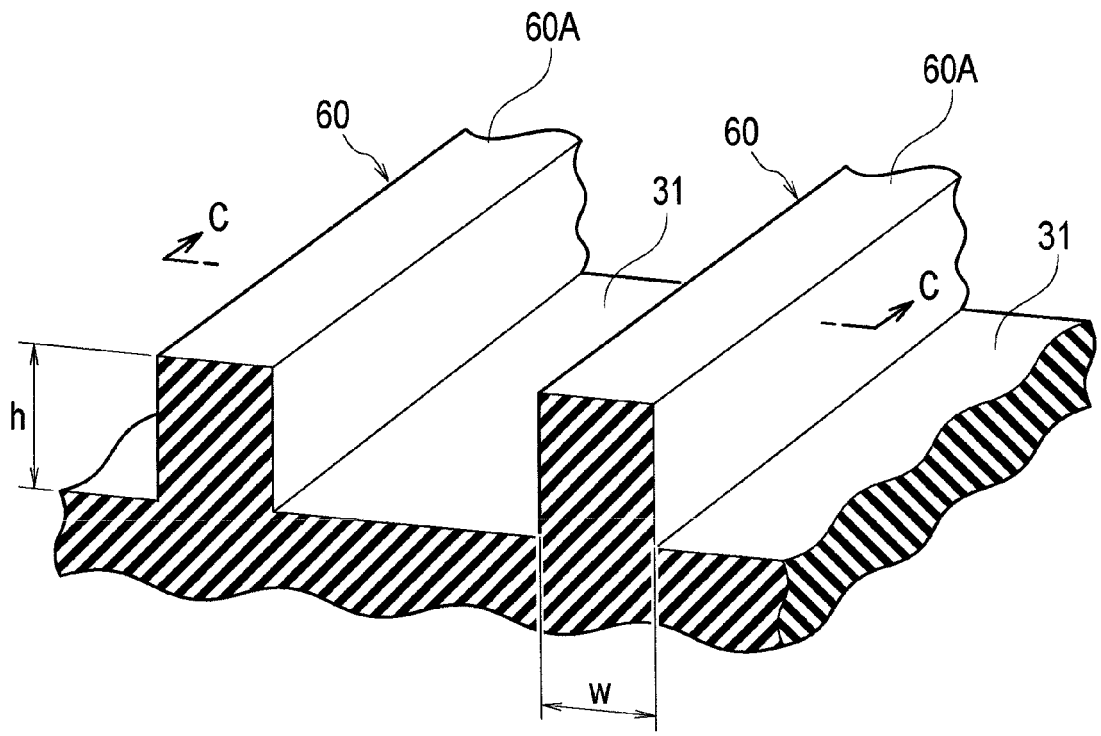
FIG. 7 is a partial perspective view of the radial protrusions according to the first embodiment.
Figure 8:
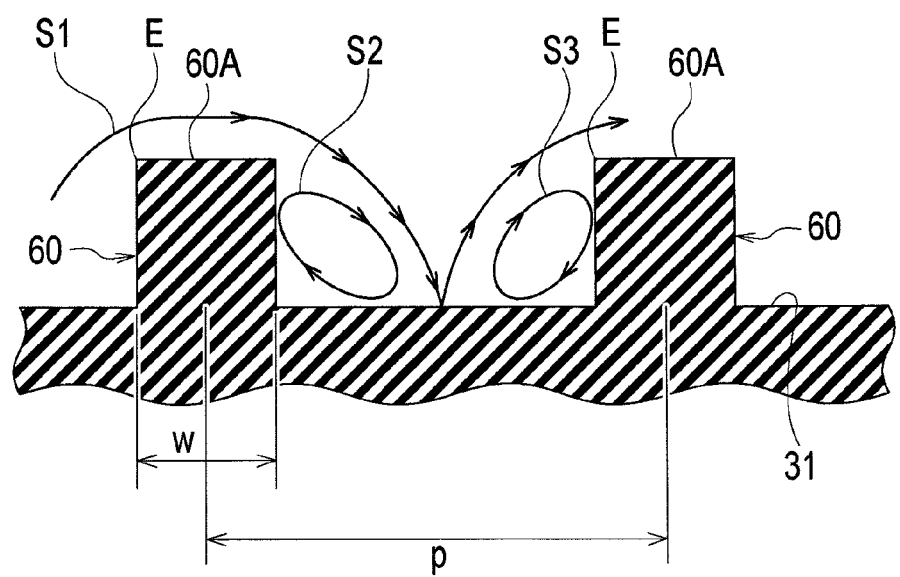
FIG. 8 is a cross-sectional view of the radial protrusions according to the first embodiment (taken along a C-C line in FIG. 7).

Next, a relation between the radial protrusions 60 adjacent to each other in a tire circumferential direction is described with reference to the drawings. FIG. 7 is a partial perspective view of the radial protrusions according to the first embodiment. FIG. 8 is a cross-sectional view of the radial protrusions according to the first embodiment (taken in the C-C line in FIG. 7).

As FIGS. 7 and 8 show, the radial protrusions 60 preferably have a relation of $1.0 \leq p/h \leq 50.0$ and $1.0 \leq (p-w)/w \leq 100.0$, where "h" is the radial protrusion height, "w" is the radial-protrusion width, and "p" is the pitch between the radial protrusions 60 adjacent to each other. The pitch p indicates a distance between the center of the radial-protrusion width w of one radial protrusion 60 and the center of the radial-protrusion width w of an adjacent radial protrusion 60, the distance being measured at their outer end portions 62 (end faces 62A).

It is particularly preferable that the radial protrusions 60 have a relation of $2.0 \leq p/h \leq 24.0$ and $4.0 \leq (p-w)/w \leq 39.0$. It is even more preferably that the radial protrusions 60 have a relation of $10.0 \leq p/h \leq 20.0$ and $4.0 \leq (p-w)/w \leq 39.0$.

When the ratio of the pitch p to the radial-protrusion height h (p/h) is larger than 1.0, air crossing over the radial protrusion 60 and then flowing toward the tire surface 31 in the direction substantially perpendicular thereto (so-called downflow) heavily collides with the tire surface 31 easily at a position between the radial protrusions 60. Consequently, the temperature rise in the tire side portion 30 is further suppressed. On the other hand, when the ratio of the pitch p to the radial-protrusion height h (p/h) is smaller than 50.0, air crossing over the radial protrusion 60 and then flowing toward the tire surface 31 in the direction substantially perpendicular thereto (so-called downflow) is generated more with respect to the radiation area. As a result, the temperature rise in the tire side portion 30 is further suppressed.

When the radio of a difference between the pitch p and the radial-protrusion width w to the radial-protrusion width w ((p-w)/w) is larger than 1.0, the radiation area is larger than the surface areas (top faces 60A) of the radial protrusions 60. As a result, the temperature rise in the tire side portion 30 is suppressed. On the other hand, when the ratio of the difference between the pitch p and the radial-protrusion width w to the radial-protrusion width w ((p-w)/w) is smaller than 100.0, air crossing over the radial protrusion 60 and then flowing toward the tire surface 31 in the direction substantially perpendicular thereto (so-called downflow) is generated more than in a case where ((p-w)/w) is larger than 100.0. As a result, the temperature rise in the tire side portion 30 is further suppressed.

(Flow of Air)

Figure 9:
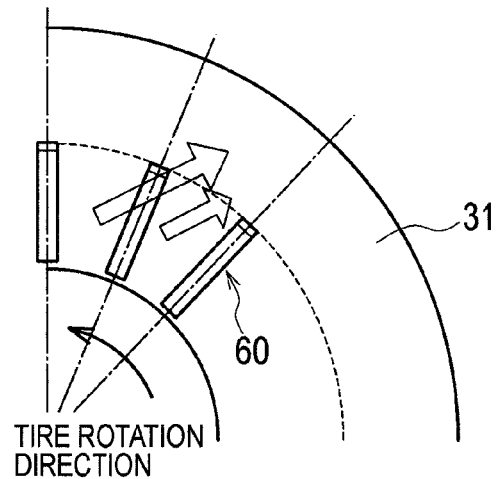
FIG. 9 is a diagram illustrating flow of air crossing over the radial protrusions according to the first embodiment.

Next, flow of air crossing over the radial protrusions 60 according to the first embodiment is described with reference to a drawing. FIG. 9 is a diagram illustrating flow of air crossing over the radial protrusions 60 according to the first embodiment.

As FIG. 9 shows, airflow flowing on the tire side portion (the tire surface 31) crosses over multiple radial protrusions 60. Specifically, as FIG. 8 shows, airflow S1 generated by the rotation of the pneumatic tire 1 is separated from the tire surface 31 by the radial protrusions 60. The airflow S1 separated from the tire surface 31 crosses over an edge portion E of the radial protrusion 60 located on a front side of the radial protrusion 60 in the tire rotation direction. The airflow S1 having crossed over the radial protrusion 60 flows toward the tire surface 31 in the direction substantially perpendicular thereto at a position behind the radial protrusion 60 in the tire rotation direction (i.e., becomes so-called downflow). Then, the airflow S1 collides heavily with the tire surface 31, and travels toward the adjacent radial protrusion 60.

In this event, fluid S2 staying behind the radial protrusion 60 in the tire rotation direction draws heat staying there and joins the airflow S1. On the other hand, fluid S3 staying before the adjacent radial protrusions 60 in the tire rotation direction draws heat staying there and joins the airflow S1, as well.

As described, the airflow S1 flows toward the tire surface 31 in the direction substantially perpendicular thereto at a position behind the radial protrusion 60 in the tire rotation direction, and then collides heavily with the tire surface 31. Further, the fluid S2 and the fluid S3 having drawn heat join the airflow S1. Accordingly, the airflow S1 and the tire surface 31 actively exchange heat with each other, decreasing the temperature rise in the tire side portions 30 in a large area.

(Advantageous Effects)

In the first embodiment, the pneumatic tire 1 includes the multiple radial protrusions 60 protruding from the tire surface 31 outward in the tire width direction. The airflow S1 flowing on the tire side portion 30 (the tire surface 31) crosses over the radial protrusion 60. The airflow S1 then flows toward the tire surface 31 in the direction substantially perpendicular thereto at a position behind the radial protrusion 60 in the tire rotation direction, and collides heavily with the tire surface 31. Consequently, the airflow S1 and the tire surface 31 actively exchange heat with each other, sufficiently suppressing the temperature rise in the tire side portion 30 (the tire surface 31). Thus, the durability of the tire improves.

Figure 10A:
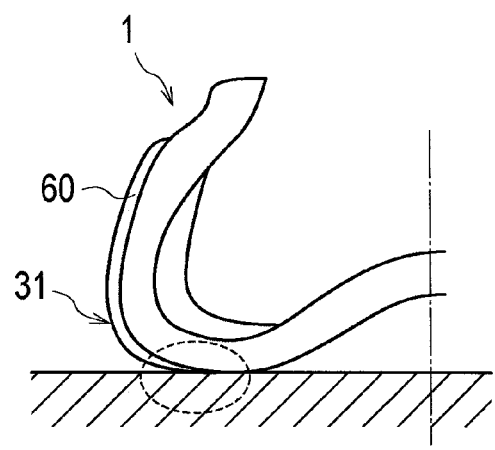
FIG. 10 shows diagrams illustrating advantageous effects of the radial protrusions according to the first embodiment.
Figure 10B:
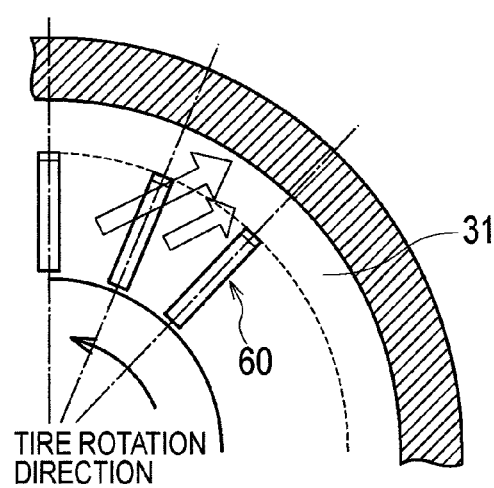

Here, a description is given of a case where the outer end portions 62 of the radial protrusions 60 are provided outside the maximum width portion T in the tire radial direction. As shown in FIG. 10, if the tire side portions 30 are deformed when the pneumatic tire 1 runs flat (runs with a tire internal pressure of 0 kPa), the radial protrusions 60 come in contact with the road surface. As a result, the radial protrusions 60 suffer from friction heat, increasing the temperature in the tire side portions 30. Moreover, friction between the radial protrusions 60 and the road surface might chip or remove the radial protrusions 60. This consequently lowers the visibility for the pneumatic tire 1.

With this taken into consideration, in the first embodiment, the outer end portions 62 are provided in the maximum width portion T. Accordingly, even if the tire side portions 30 are deformed when the pneumatic tire 1 runs flat (runs with a tire internal pressure of 0 kPa), the radial protrusions 60 do not come in contact with the road surface. As a result, the radial protrusions 60 do not suffer from friction heat, sufficiently suppressing the temperature rise in the tire side portion 30 (the tire surface 31). In addition, since the radial protrusions 60 are not chipped or removed, the visibility for the pneumatic tire 1 is not lowered.

In the first embodiment, the radial-protrusion height h is 0.5 mm to 7 mm, both inclusive, and the radial-protrusion width w is 0.3 mm to 4 mm, both inclusive. Accordingly, the airflow S1 flowing toward the tire surface 31 in the direction substantially perpendicular thereto (downflow) collides heavily with the tire surface 31 at a position behind the radial protrusion 60 in the tire rotation direction. Accordingly, the airflow S1 and the tire surface 31 actively exchange heat with each other to further suppress the temperature rise in the tire side portions 30.

In the first embodiment, the extending-direction angle ($\theta$) is set within the range of $-70° \leq \theta \leq 70°$. Accordingly, the airflow S1 flows easily over the multiple radial protrusions 60. Consequently, the airflow S1 and the tire surface 31 actively exchange heat with each other, further suppressing the temperature rise in the tire side portion 30.

In the first embodiment, the radial protrusions 60 are set to have a relation of $1.0 \leq p/h \leq 50.0$ and $1.0 \leq (p-w)/w \leq 100.0$. This allows the airflow S1 and the tire surface 31 to actively exchange heat with each other, decreasing the temperature rise in the tire side portion 30 in a large area.

(First Embodiment: Modification 1)

In the above description, the end face 62A according to the first embodiment has a constant angle with respect to the tire surface 31. However, the following modification may be made. The same portions as those of the pneumatic tire 1 according to the first embodiment are denoted by the same reference signs. Different portions are mainly described.

Figure 11:
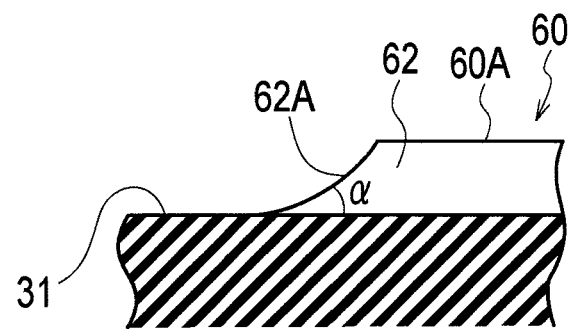
FIG. 11 is an enlarged side view of a radial protrusion according to Modification 1 of the first embodiment.

FIG. 11 is an enlarged side view of a radial protrusion according to Modification 1. As FIG. 11 shows, the outer end portion 62 has an end face 62A at an outer side thereof in the tire radial direction. This end face 62A has a varying angle ($\alpha$) with respect to the tire surface 31. The height of the outer end portion measured in the tire width direction only needs to decrease toward an outer side in the tire radial direction.

(First Embodiment: Modification 2)

In the above description, the end face 62A according to the first embodiment inclines with respect to the tire surface 31. However, the following modification may be made. The same portions as those of the pneumatic tire 1 according to the first embodiment are denoted by the same reference signs. Different portions are mainly described.

Figure 12:
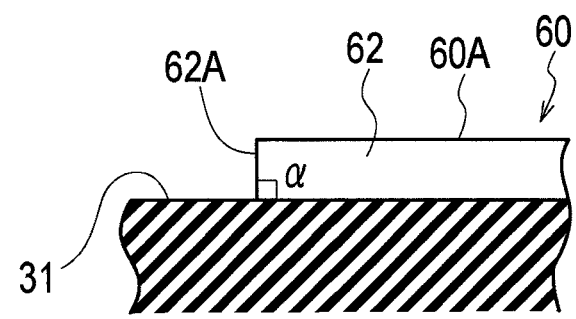
FIG. 12 is an enlarged side view of a radial protrusion according to Modification 2 of the first embodiment.

FIG. 12 is an enlarged side view of a radial protrusion according to Modification 2. As FIG. 12 shows, the outer end portion 62 has an end face 62A at an outer side thereof in the tire radial direction. This end face 62A has an angle of 90° with respect to the tire surface 31. The end face 62A only needs to form an angle larger than 0° but not exceeding 90°.

(First Embodiment: Modification 3)

In the above description, the radial-protrusion width w according to the first embodiment is constant in the tire radial direction. However, the following modification may be made. The same portions as those of the pneumatic tire 1 according to the first embodiment are denoted by the same reference signs. Different portions are mainly described.

Figure 13:
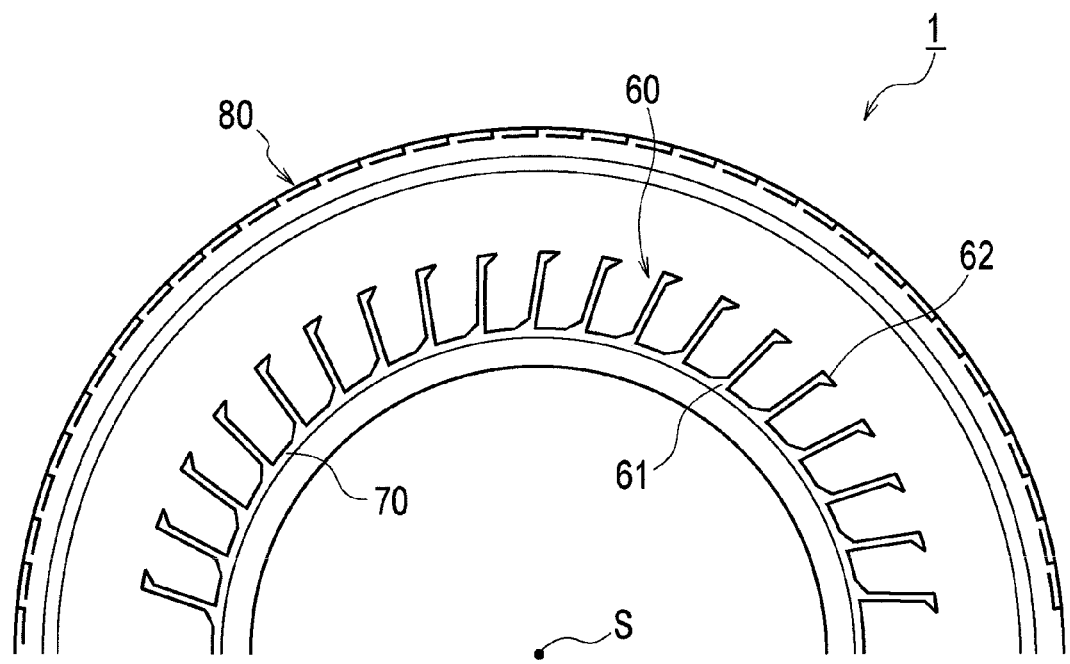
FIG. 13 is a side view of a pneumatic tire according to Modification 3 of the first embodiment.

FIG. 13 is a side view of a pneumatic tire according to Modification 3. As FIG. 13 shows, the radial-protrusion width w is not constant in the tire radial direction.

Specifically, the width of the inner end portion 61 measured in the direction substantially perpendicular to the tire radial direction (to the extending direction of the protrusion) is larger than the radial-protrusion width w of the radial protrusion 60 measured at its center portion in the tire radial direction. The width of the outer end portion 62 measured in the direction substantially perpendicular to the tire radial direction (to the extending direction of the protrusion) is larger than the radial-protrusion width w of the radial protrusion 60 measured at its center portion in the tire radial direction.

(First Embodiment: Modification 4)

In the above description, the radial-protrusions 60 according to the first embodiment extend straight in the tire radial direction. However, the following modification may be made. The same portions as those of the pneumatic tire 1 according to the first embodiment are denoted by the same reference signs. Different portions are mainly described.

Figure 14:
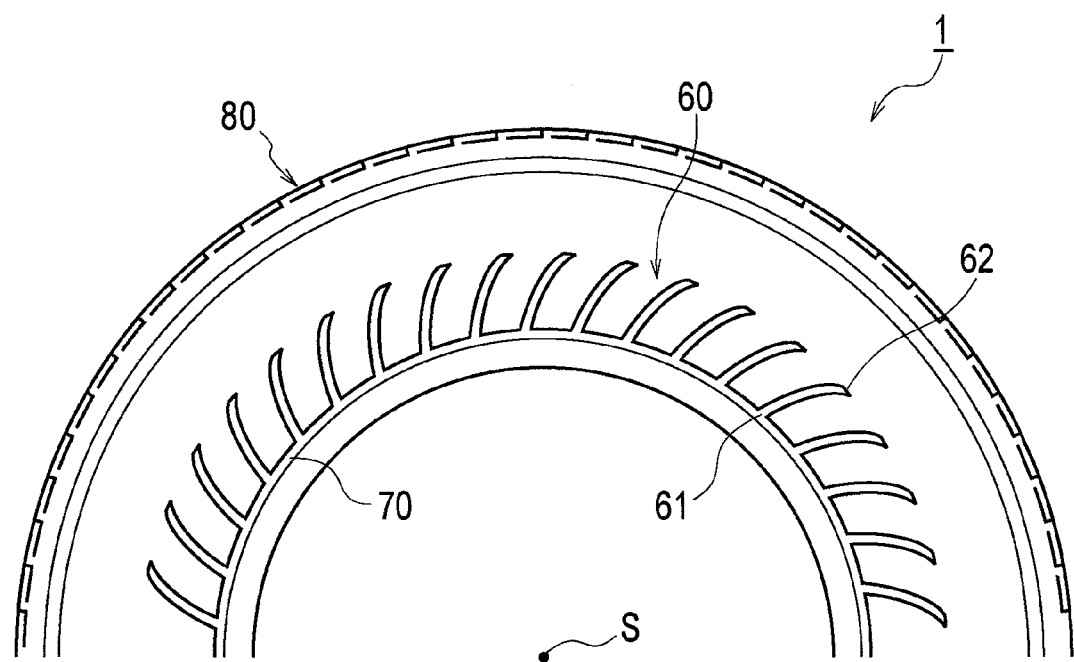
FIG. 14 is a side view of a pneumatic tire according to Modification 4 of the first embodiment.

FIG. 14 is a side view of a pneumatic tire according to Modification 4. As FIG. 14 shows, the radial protrusions 60 each curve with respect to the tire radial direction. In other words, the extending-direction angle (θ) largely changes from an inner side, in the tire radial direction, of the protrusion 60 to an outer side, in the tire radial direction, of the protrusion 60.

The extending-direction angle (θ) does not necessarily have to largely change from the inner side in the tire radial direction to the outer side in the tire radial direction. The extending-direction angle (θ) may slightly change from the inner side in the tire radial direction to the outer side in the tire radial direction.

[Second Embodiment]

Figure 15:
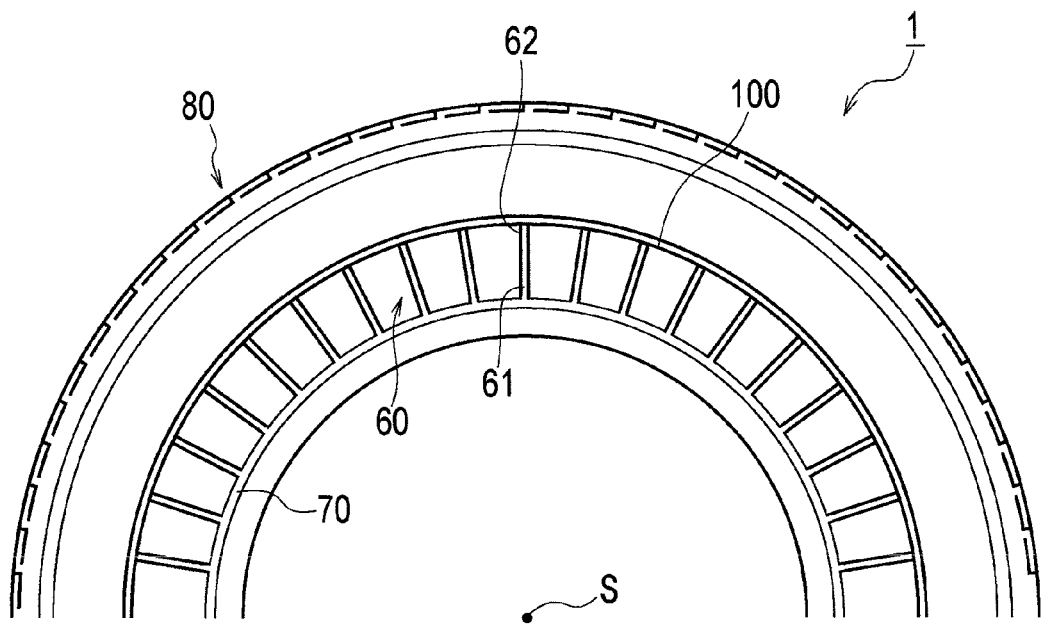
FIG. 15 is a side view showing part of a pneumatic tire according to a second embodiment.
Figure 16A:
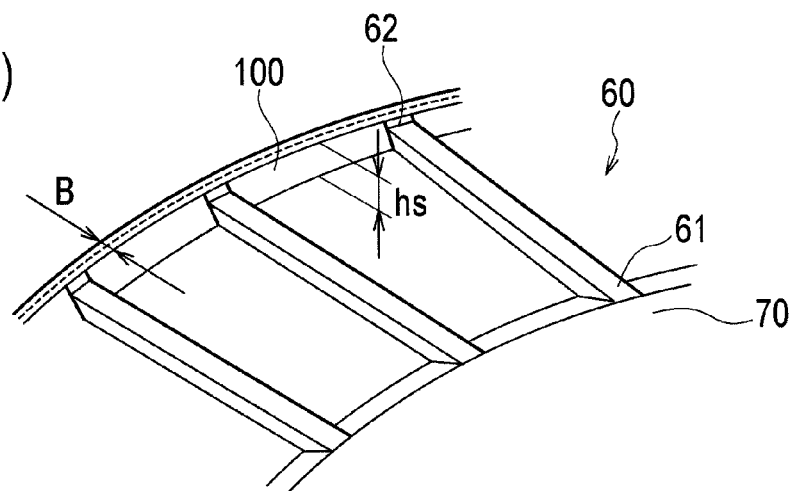
FIG. 16 shows diagrams of radial protrusions according to the second embodiment.
Figure 16B:
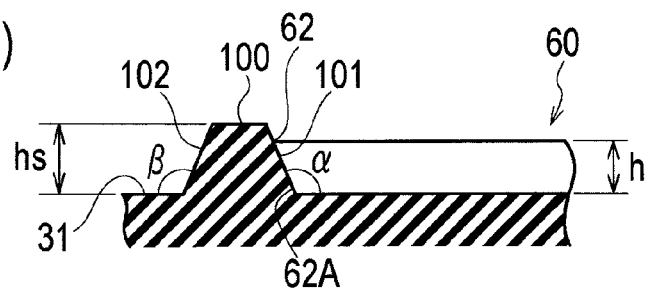

Hereinafter, the configuration of a pneumatic tire according to a second embodiment is described with reference to the drawings. FIG. 15 is a side view showing part of the pneumatic tire according to the second embodiment. FIG. 16 shows diagrams of radial protrusions according to the second embodiment. The same portions as those of the pneumatic tire 1 according to the first embodiment described above are denoted by the same reference signs. Different portions are mainly described. The configurations of the radial protrusions 60 are the same as that of the first embodiment.

As FIGS. 15 and 16 show, the pneumatic tire 1 includes not only the radial protrusions 60, but also a circular circumferential protrusion 100. The circular circumferential protrusion 100 extends along the circumference of a circle having the tire rotation axis S as the center, and has a shape protruding from the tire surface 31 outward in the tire width direction. The circular circumferential protrusion 100 is provided in the maximum width portion T.

As part (b) of FIG. 16 shows, the circular circumferential protrusion 100 is formed to be substantially trapezoidal in a cross section taken in a direction substantially perpendicular to the tire circumferential direction (i.e., to the extending direction of the protrusion). Specifically, the circular circumferential protrusion 100 has an inner face 101 located at its inner side in the tire radial direction and an outer face 102 located at its outer side in the tire radial direction.

The inner face 101 inclines (α) with respect to the tire surface 31. In other words, the end face 62A of the outer end portion 62 forms an angle (α) larger than 90° with respect to the tire surface 31. Accordingly, the end face 62A is continuous with the inner face 101 which inclines with respect to the tire surface 31.

When the circular circumferential protrusion 100 is provided, the outer end portions 62 are each located at an outermost position in the tire radial direction. In other words, it should be noted that the outer end portions 62 only need to be provided in the maximum width portion T.

As described above, when the circular circumferential protrusion 100 is provided, the end face 62A of the outer end portion 62 may form an angle (α) larger than 90° with respect to the tire surface 31.

Figure 17:
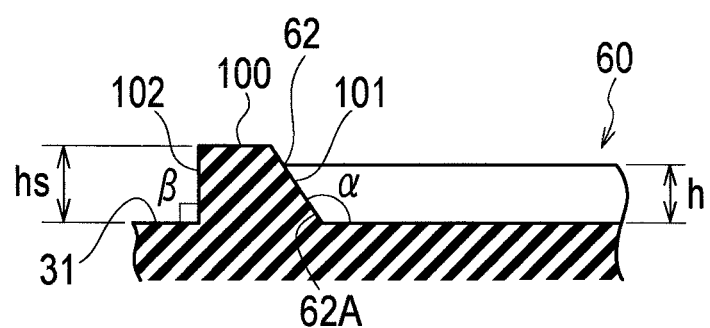
FIG. 17 is an enlarged side view of the radial protrusion according to the second embodiment.

The outer face 102 inclines (β) with respect to the tire surface 31. The outer face 102 does not necessarily have to incline with respect to the tire surface 31. For example, as shown in FIG. 17, the outer face 102 may form an angle of 90° with respect to the tire surface 31. The outer face 102 preferably forms an angle (β) equal to or larger than 90° but not exceeding 180° with respect to the tire surface 31.

The height of the circular circumferential protrusion 100 measured in the tire width direction (called a circumferential-protrusion height hs) is preferably 0.2 times to 1.5 times, both inclusive, of the maximum height of each of the multiple radial protrusions measured in the tire width direction (i.e., the radial protrusion height h).

When the circumferential-protrusion height hs is 0.2 times or more of the radial-protrusion height h, airflow flowing on the maximum width portion T is prevented from being separated from the tire surface 31. Thereby, the temperature rise in the tire side portion 30 is sufficiently suppressed. On the other hand, when the circumferential protrusion height hs is 1.5 times or less of the radial-protrusion height h, the circular circumferential protrusion 100 can be provided with enough rigidity. This further improves the durability of the circular circumferential protrusion 100.

The width of the circular circumferential protrusion 100 measured in the tire radial direction (called a circumferential-protrusion width B) is preferably 2 mm to 22 mm. This circumferential protrusion width B does not necessarily have to be constant in the tire circumferential direction. The circumferential protrusion width B does not have to be constant in the tire circumferential direction.

When the circumferential protrusion width B is 2 mm or larger, airflow flowing toward the tire surface 31 in the direction substantially perpendicular thereto (so-called downflow) is generated at a position outside (downstream), in the tire radial direction, of the circular circumferential protrusion 100. This sufficiently suppresses the temperature rise in the tire side portion 30 (the tire surface 31). On the other hand, when the circumferential protrusion width B is 22 mm or smaller, airflow flowing on the maximum width portion T is prevented from being separated from the tire surface 31. This sufficiently suppresses the temperature rise in the tire side portion 30.

(Flow of Air)

Figure 18A:
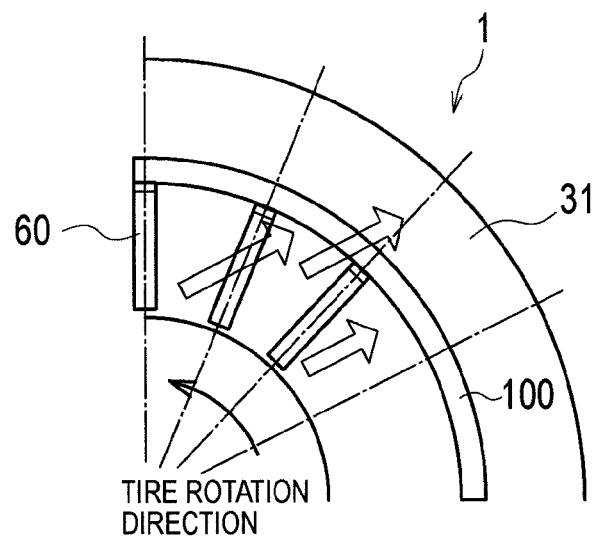
FIG. 18 shows diagrams illustrating flow of air crossing over the radial protrusions and a circular circumferential protrusion according to the second embodiment.
Figure 18B:
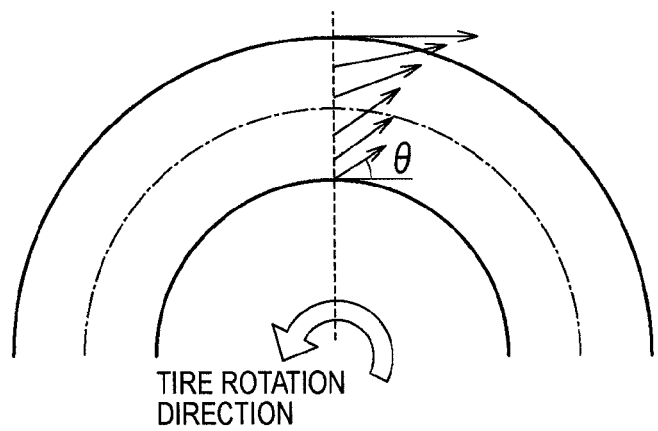
Figure 18C:
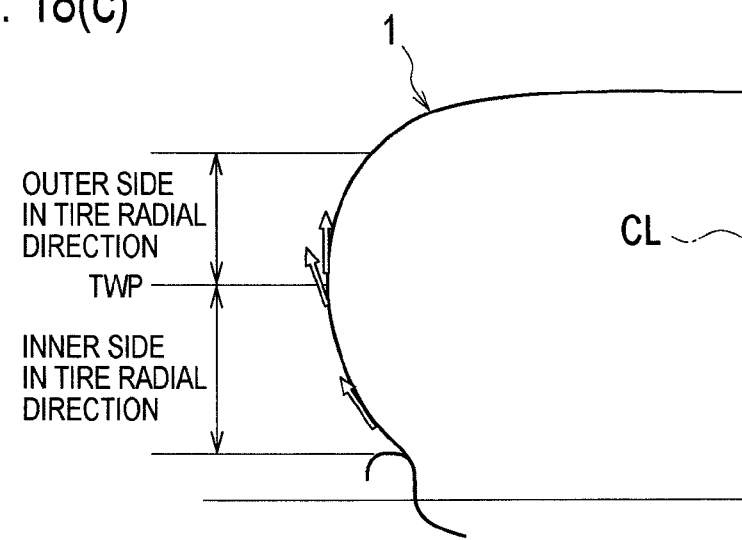

Next, flow of air crossing over the radial protrusions 60 according to the second embodiment is described with reference to a drawing. FIG. 18 is a diagram illustrating flow of air crossing over the radial protrusions and a circular circumferential protrusion according to the second embodiment.

As part (a) of FIG. 18 shows, in the tire side portion 30, the circumference is longer on an outer side in the tire radial direction than on an inner side in the tire radial direction. Accordingly, airflow flowing on an inner side, in the tire radial direction, of the point TWP corresponding to the tire maximum width TW (inner airflow) travels slower than air flowing on an outer side, in the tire radial direction, of the point TWT corresponding to the tire maximum width TW (outer air).

Accordingly, as part (b) of FIG. 18 shows, the inner airflow is pulled by the outer airflow and is directed outward in the tire radial direction by the centrifugal force. Specifically, the closer to the tire rotation axis S, the larger an inclination angle θ of airflow with respect to the tangent to the tire circumference. In other words, the inner airflow has a larger radial component directed in the tire radial direction and a smaller circumferential component directed in the tire circumferential direction than the outer airflow does.

As part (c) of FIG. 18 shows, the pneumatic tire 1 has a shape with a curvature in a cross section taken in the tire width direction. Accordingly, the inner airflow having a large radial component is easily separated from the tire surface 31 (or easily moves away from the tire surface 31) in the tire radial direction.

With this taken into consideration, the pneumatic tire 1 further includes the circular circumferential protrusion 100. Accordingly, the inner airflow having a large radial component crosses over the circular circumferential protrusion 100 and is caught on the tire surface 31. To be more specific, airflow having crossed over the circular circumferential protrusion 100 flows toward the tire surface 31 in the direction substantially perpendicular thereto at a position outside of the circular circumferential protrusion 100 in the tire radial direction (i.e., outside of the point TWP corresponding to the tire maximum width TW in the tire radial direction) (i.e., becomes so-called downflow).

Accordingly, the inner airflow having a large radial component is not easily separated from the tire surface 31. In other words, airflow flowing on the maximum width portion T is easily attached to the tire surface 31 at a position near the tire maximum width TW.

On the other hand, as in the first embodiment, airflow having a circumferential component (the airflow S1) flows toward the tire surface 31 in the direction substantially perpendicular thereto at a position behind the radial protrusions 60 in the tire rotation direction, and collides heavily with the tire surface 31 (see FIG. 8). Further, the fluid S2 and the fluid S3 each having drawn heat join the airflow S1. This causes the airflow S1 and the tire surface 31 to actively exchange heat with each other, decreasing the temperature rise in the tire side portion 30 in a large area.

(Advantageous Effects)

In the second embodiment, the pneumatic tire 1 further includes the circular circumferential protrusion 100 extending in the circumferential direction. Accordingly, the inner airflow having a large radial component crosses over the circular circumferential protrusion 100 and is caught on the tire surface 31. Specifically, the airflow having crossed over the circular circumferential protrusion 100 flows toward the tire surface 31 in the direction substantially perpendicular thereto at a position outside of the circular circumferential protrusion 100 in the tire radial direction (i.e., become so-called downflow).

Consequently, the inner airflow having a large radial component (i.e., airflow flowing on the maximum width portion T) is not easily separated from the tire surface 31. In other words, the airflow flowing on the maximum width portion T is easily attached to the tire surface 31 at a position near the tire maximum width TW. Since the airflow flowing on the maximum width portion T is retained on the tire surface 31, the airflow S1 and the tire surface 31 can actively exchange heat with each other.

(Second Embodiment: Modification 1)

In the above description, the inner face 101 according to the second embodiment inclines with respect to the tire surface 31. However, the following modification may be made. The same portions as those of the pneumatic tire 1 according to the second embodiment are denoted by the same reference signs. Different portions are mainly described.

Figure 19A:
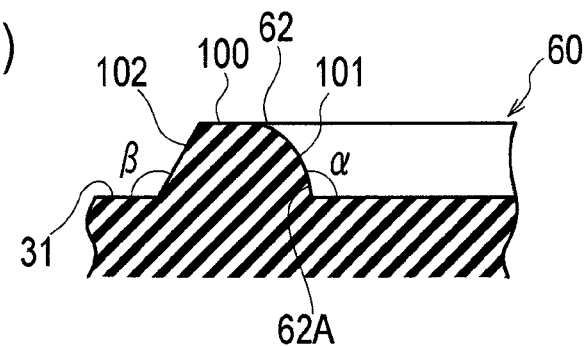
FIG. 19 shows enlarged side views of a radial protrusion according to Modification 1 of the second embodiment.
Figure 19B:
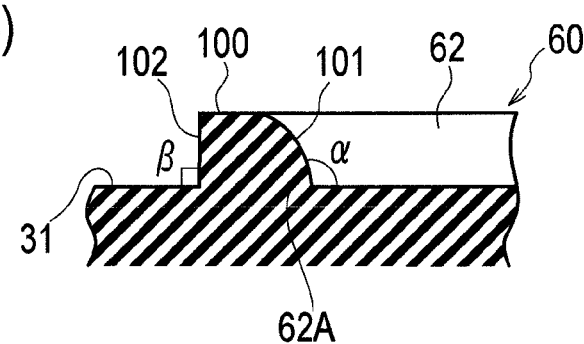

FIG. 19 is an enlarged side view of a radial protrusion according to Modification 1. As part (a) of FIG. 19 shows, the inner face 101 curves with respect to the tire surface 31. In other words, the end face 62A of the outer end portion 62 curves with respect to the tire surface 31. The end face 62A is continuous with the curving inner face 101. Accordingly, it should be noted that the inner face 101 does not necessarily have to have a constant angle (α) with respect to the tire surface 31.

The outer face 102 inclines (β) with respect to the tire surface 31. Note that the outer face 102 does not necessarily have to incline with respect to the tire surface 31, and may have, for example, an angle (β) of 90° with respect to the tire surface 31, as shown in part (b) of FIG. 19. The outer face 102 preferably forms an angle (β) equal to or larger than 90° but not exceeding 180° with respect to the tire surface 31.

(Second Embodiment: Modification 2)

In the above description, the circular circumferential protrusion 100 according to the second embodiment is formed to be substantially trapezoidal in a cross section taken in the direction substantially perpendicular to the tire circumferential direction (i.e., to the extending direction of the protrusion). However, the following modification may be made. The same portions as those of the pneumatic tire 1 according to the second embodiment are denoted by the same reference signs. Different portions are mainly described.

Figure 20A:
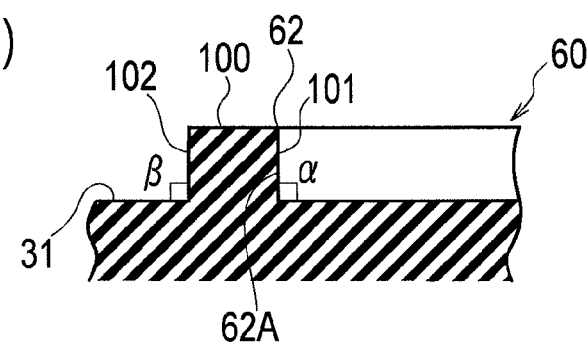
FIG. 20 shows enlarged side views of a radial protrusion according to Modification 2 of the second embodiment.
Figure 20B:
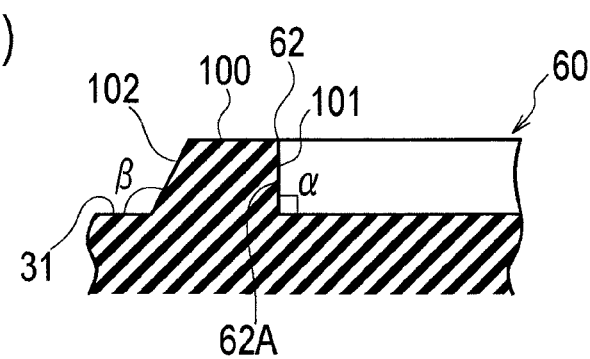

FIG. 20 shows enlarged side views of a radial protrusion according to Modification 2. As part (a) of FIG. 20 shows, the circular circumferential protrusion 100 is formed to be substantially quadrangular in a cross section taken in the direction substantially perpendicular to the tire circumferential direction (i.e., to the extending direction of the protrusion). Specifically, the circular circumferential protrusion 100 has the inner face 101 located on its inner side in the tire radial direction and an outer face 102 located on its outer side in the tire radial direction.

The inner face 101 forms an angle (α) of 90° with respect to the tire surface 31. In other words, the end face 62A of the outer end portion 62 forms an angle (α) of 90° with respect to the tire surface 31. The end face 62A is continuous with the inner face 101 forming an angle (α) of 90° with respect to the tire surface 31. The inner face 101 preferably forms an angle (α) equal to or larger than 90° but not exceeding 180° with respect to the tire surface 31.

The outer face 102 forms an angle (β) of 90° with respect to the tire surface 31. The outer face 102 does not necessarily have to form an angle of 90° with respect to the tire surface 31, and, for example, may incline with respect to the tire surface 31, as shown in part (b) of FIG. 20. The outer face 102 preferably forms an angle (β) equal to or larger than 90° but not exceeding 180° with respect to the tire surface 31.

(Second Embodiment: Modification 3)

In the above description, the radial-protrusion width w according to the second embodiment is constant in the tire radial direction. However, the following modification may be made. The same portions as those of the pneumatic tire 1 according to the second embodiment are denoted by the same reference signs. Different portions are mainly described.

Figure 21:
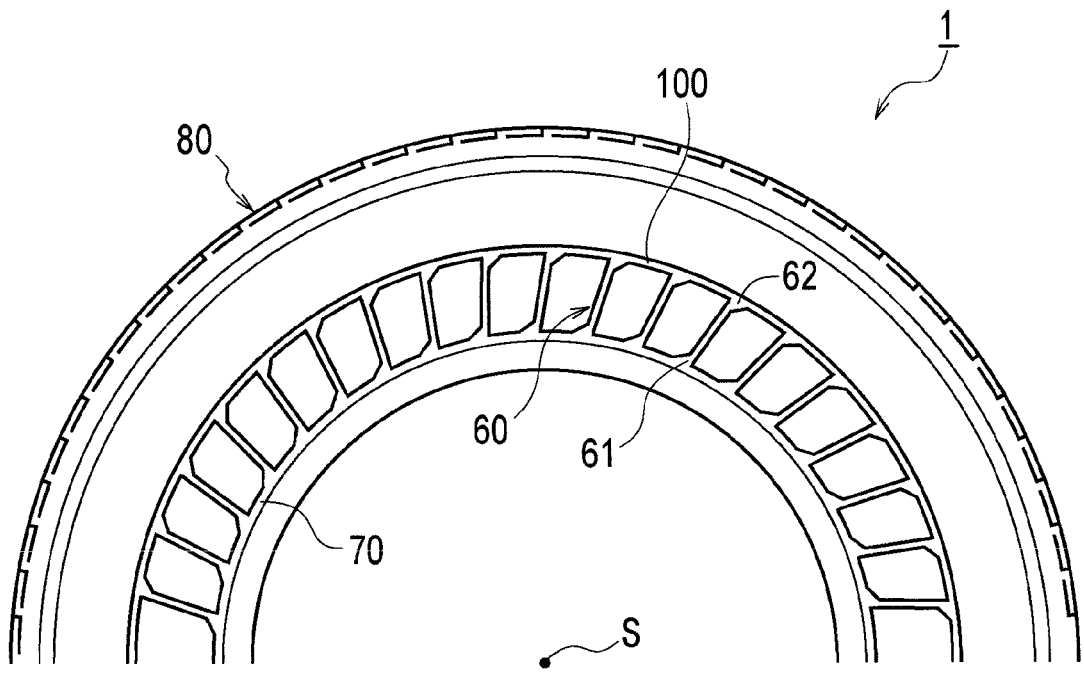
FIG. 21 is a side view of a pneumatic tire according to Modification 3 of the second embodiment.

FIG. 21 is a side view of a pneumatic tire according to Modification 3. As FIG. 21 shows, the radial-protrusion width w is not constant in the tire radial direction.

Specifically, the width of the inner end portion 61 measured in the direction substantially perpendicular to the tire radial direction (to the extending direction of the protrusion) is larger than the radial-protrusion width w of the radial protrusion 60 measured at its center portion in the tire radial direction. In other words, the inner end portion 61 continues into the rim guard 70 by a large width.

The width of the outer end portion 62 measured in a direction substantially perpendicular to the tire radial direction (to the extending direction of the protrusion) is larger than the radial-protrusion width w of the radial protrusion 60 measured at its center portion in the tire radial direction. In other words, the outer end portion 62 continues into the circular circumferential protrusion 100 by a large width.

(Second Embodiment: Modification 4)

In the above description, the radial-protrusions 60 according to the second embodiment extend straight in the tire radial direction. However, the following modification may be made. The same portions as those of the pneumatic tire 1 according to the first embodiment are denoted by the same reference signs. Different portions are mainly described.

Figure 22:
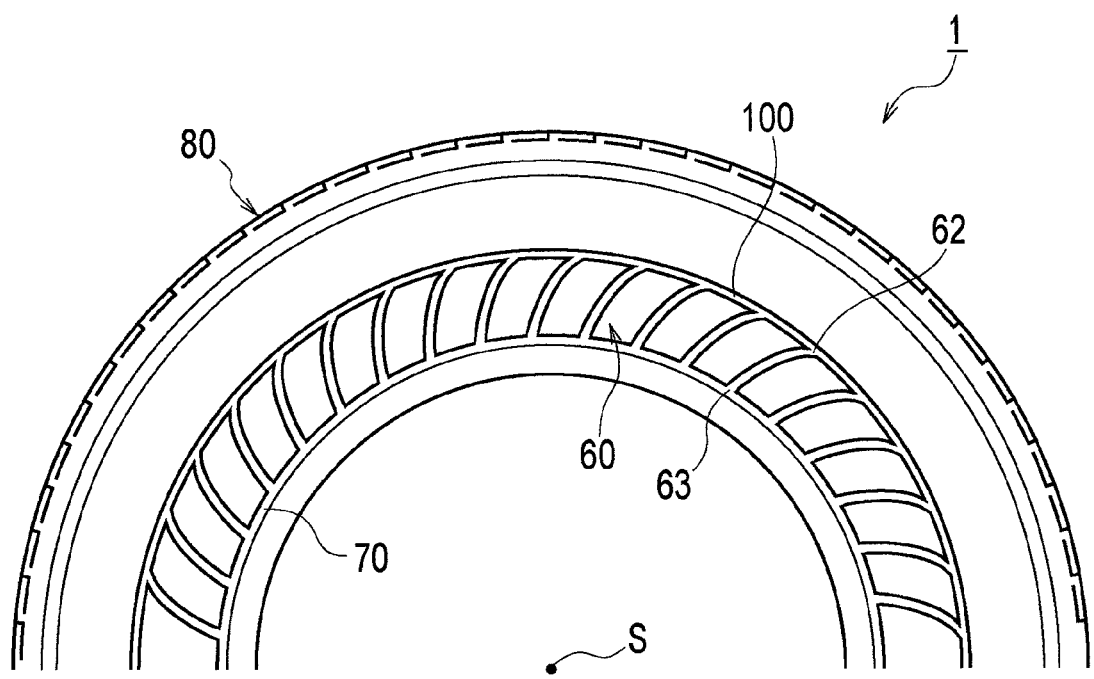
FIG. 22 is a side view of a pneumatic tire according to Modification 4 of the second embodiment.

FIG. 22 is a side view of a pneumatic tire according to Modification 4. As FIG. 22 shows, the radial protrusions 60 each curve with respect to the tire radial direction. In other words, the extending-direction angle (θ) largely changes from an inner side, in the tire radial direction, of the protrusion 60 to an outer side, in the tire radial direction, of the protrusion 60.

The extending-direction angle (θ) does not necessarily have to largely change from the inner side in the tire radial direction to the outer side in the tire radial direction. The extending-direction angle (θ) may slightly change from the inner side in the tire radial direction to the outer side in the tire radial direction.

[Other Embodiments]

As described above, the details of the present invention have been disclosed by using the embodiments of the present invention. However, it should not be understood that the description and drawings which constitute part of this disclosure limit the present invention.

Specifically, in the above description, the inner end portions 61 of the multiple radial protrusions 60 smoothly continue into the rim guard 70. However, the present invention is not limited to such a case. The inner end portions 61 of the multiple radial protrusions 60 may be separated from the rim guard 70. In other words, the rim guard 70 does not necessarily have to be provided on the tire surface 31.

In the above description, the multiple radial protrusions 60 are each formed to be substantially quadrangular in a cross section taken in the direction substantially perpendicular to the tire radial direction (to the extending direction of the protrusions). However, the present invention is not limited to such a case. For example, the multiple radial protrusions 60 may be formed to be substantially triangular or substantially trapezoidal.

The height of the radial protrusions 60 (the radial-protrusion height h) and the height of the circular circumferential protrusion 100 (the circumferential protrusion height hs) do not necessarily have to be constant. For example, the heights h and hs each may be different on the inner side in the tire radial direction (the inner end portion 61 and the inner face 101) and on the outer side in the tire radial direction (the outer end portion 62 and the outer face 102).

Corner portions of each radial protrusion 60 may be round. For example, a border between the top face and the end face 62A of each radial protrusion 60 may be round.

In the above description, the pneumatic tire 1 has the side reinforcing layers 40 (namely, is a run-flat tire). However, the present invention is not limited to such a case. The pneumatic tire 1 does not have to have the side reinforcing layers 40.

From this disclosure, various alternative embodiments, examples, and operation techniques will be easily found by those skilled in the art. Accordingly, the technical scope of the present invention should be determined only by the matters to define the invention in the scope of claims regarded as appropriate based on the description.

EXAMPLES

Next, to further clarify the effects of the present invention, results of tests conducted using pneumatic tires according to Comparative Examples and Examples below are described. The present invention is not limited whatsoever by these examples. Data on each pneumatic tire are measured under the following conditions.

Tire Size: 285/50R20
Wheel Size: 8JJ×20
Internal Pressure Condition: 0 kPa (flat)
Load Condition: 9.8 kN
Speed Condition: 90 km/h The configuration and a test result (durability) of each pneumatic tire are described with reference to Tables 1 to 3.

TABLE 1

|  |  | Comparative Example 1 | Comparative Example 2 | Example 1 | Example 2 |
|---|---|---|---|---|---|
| type of tire |  | without protrusions | only with radial protrusions (radial pattern) | radial protrusions (provided inside of maximum width in tire radial direction) | radial protrusions + circumferential protrusion |
| temperature of | A | 114 | 100 | 86 | 88 |
| tire surface | B | 120 | 100 | 100 | 89 |
| (index) | C | 107 | 100 | 100 | 99 |
| durability (index) |  | 65 | 100 | 102 | 111 |

TABLE 2

| parameter | Comparative Example 2 | Example 1 | Example 2 | Example 3 | Example 4 | Example 5 | Example 6 |
|---|---|---|---|---|---|---|---|
| (type of tire) | only with radial protrusions (radial pattern) | radial protrusions (provided inside of maximum width in tire radial direction) | ← | radial protrusions + circumferential protrusion | ← | ← | radial protrusions + circumferential protrusion |
| p/h | 15 | ← | ← | ← | ← | ← | 15 |
| (p − w)/w | 29 | ← | ← | ← | ← | ← | 29 |
| w(mm) | 2 | ← | ← | ← | ← | ← | 2 |
| h(mm) | 2 | ← | ← | ← | ← | ← | 2 |
| circumferential protrusion portion | absent | absent | present | ← | ← | ← | ← |
| height hs (mm) | — | — | 1.2 | 0.4 | 2.4 | 3.0 | 3.2 |
| hs/h (index) | — | — | 0.6 | 0.2 | 1.2 | 1.5 | 1.6 |
| width B (mm) | — | — | ← | 8 | ← | ← | 8 |
| durability (index) | 100 | 102 | 111 | 103 | 114 | 108 | 103 |

TABLE 3

| parameter | Example 7 | Example 8 | Example 5 | Example 9 | Example 10 |
|---|---|---|---|---|---|
| (type of tire) | radial protrusions + circumferential protrusion | ← | ← | ← | ← |
| p/h | 15 | ← | ← | ← | ← |
| (p − w)/w | 29 | ← | ← | ← | ← |
| w(mm) | 2 | ← | ← | ← | ← |
| h(mm) | 2 | ← | ← | ← | ← |
| circumferential protrusion portion | present | ← | ← | ← | ← |
| height hs (mm) | 3.0 | ← | ← | ← | ← |
| hs/h (index) | 1.5 | ← | ← | ← | ← |
| width B (mm) | 2 | 3 | 8 | 20 | 22 |
| durability (index) | 103 | 105 | 108 | 104 | 102 |

As Table 1 shows, the pneumatic tire according to Comparative Example 1 does not include protrusions (the radial protrusions 60 and the circular circumferential protrusion 100) on the tire surface. In the pneumatic tire according to Comparative Example 2, the outer end portions 62 of the radial protrusions 60 are provided outside of the maximum width portion T in the tire radial direction.

The pneumatic tire according to Example 1 includes the radial protrusions 60 described in the first embodiment. Accordingly, in the pneumatic tire according to Example 1, the outer end portions 62 of the radial protrusions 60 are provided in the maximum width portion T. As FIGS. 2 and 3 show, the pneumatic tires according to Examples 2 to 10 each include the radial protrusions 60 described in the first embodiment and the circular circumferential protrusion 100 described in the second embodiment.

<Durability>

Each pneumatic tire was mounted on a test drum and was run until the pneumatic tire broke (e.g., until a separation occurred near the side reinforcing layers). The durability distance is thus measured and then expressed as an index number. Using the durability of the pneumatic tire according to Comparative Example 2 as the reference of 100, the durability of each of the other pneumatic tires was evaluated. The larger the numeric value, the better the durability.

The results show that the pneumatic tires according to Examples 1 to 10 have a higher effect of radiating the heat of the tire side portions and therefore have better durability than the pneumatic tires according to Comparative Examples 1 and 2.

In the pneumatic tires according to Examples 1 to 10, since the outer end portions 62 of the radial protrusions 60 are not provided outside of the maximum width portion T, the radial protrusions 60 were not chipped or removed. Thus, it has been found that the visibility for the pneumatic tire 1 is not lowered.

Figure 23:
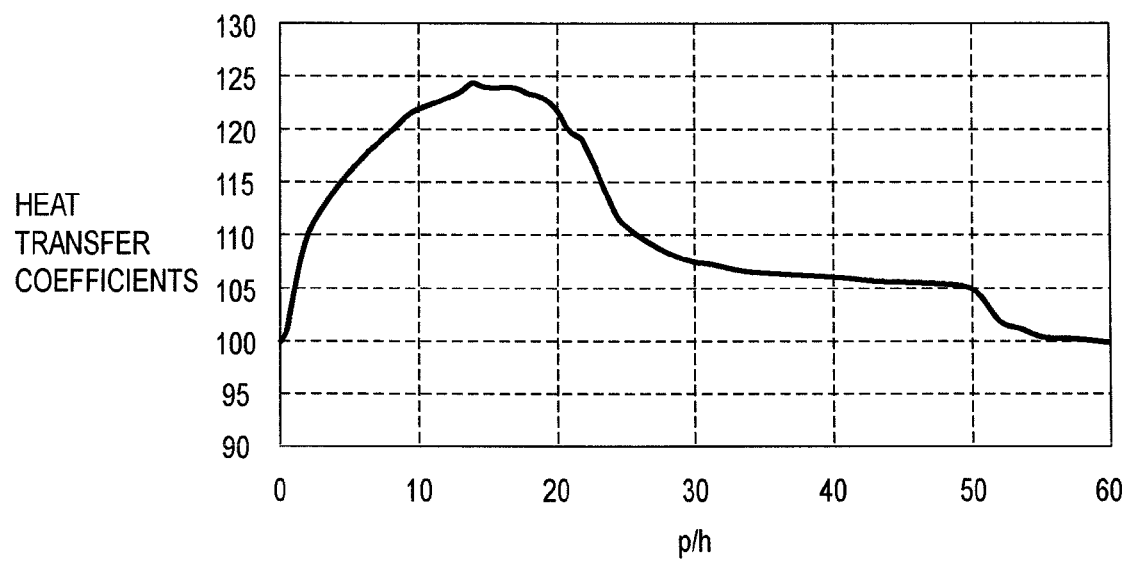
FIG. 23 is a graph showing heat transfer coefficients of a pneumatic tire of Example (part 1).
Figure 24:
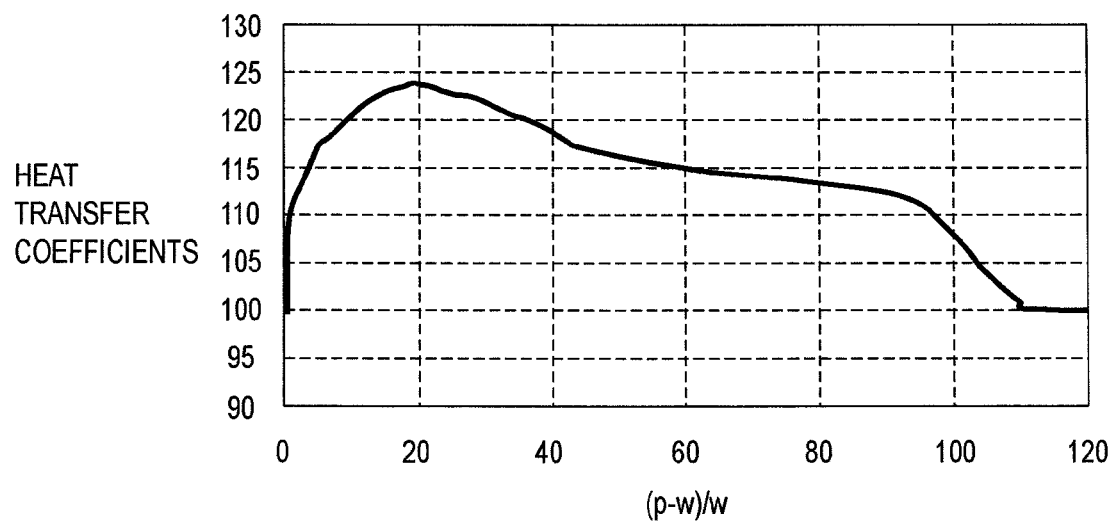
FIG. 24 is a graph showing heat transfer coefficients of a pneumatic tire of Example (part 2).
Figure 25:
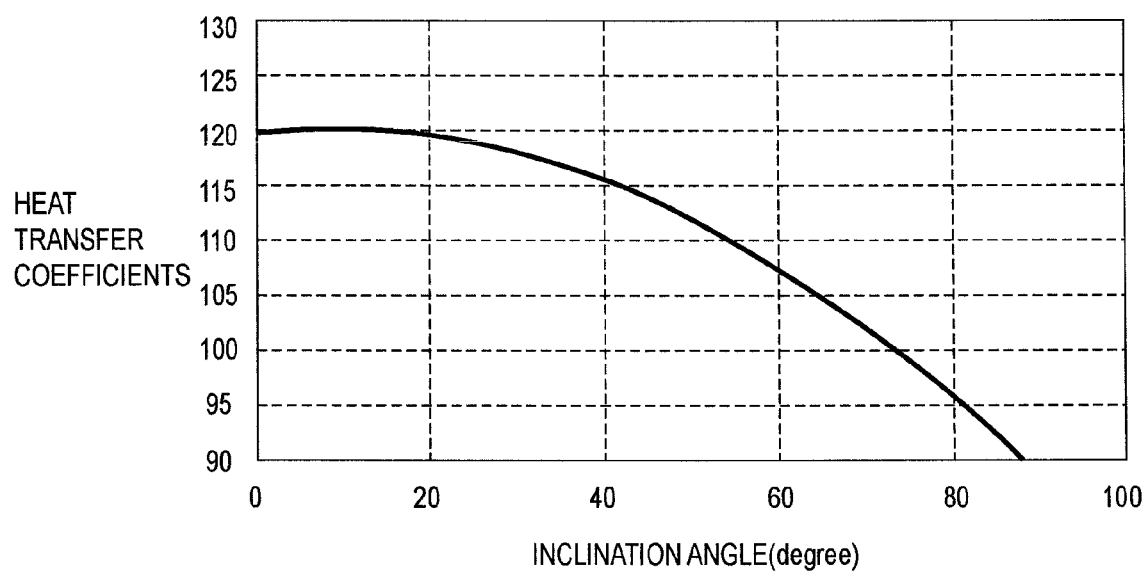
FIG. 25 is a graph showing heat transfer coefficients of a pneumatic tire of Example (part 3).

Next, FIGS. 23 to 25 show results of durability tests conducted while changing p/h, (p-w)/w, and the extending-direction angle (θ) of the turbulence generating protrusions. The vertical axis of the graph in each of FIGS. 23 to 25 indicates a heat transfer coefficient. Here, the heat transfer coefficient was obtained by: applying a constant voltage to a heater to generate a certain amount of heat; blowing the heat with a blower, and measuring the temperature of the tire surface and the amount of air blown. Accordingly, the larger the heat transfer coefficient, the higher the radiation effect of the tire side portion, namely, the better the durability. Here, the heat transfer coefficient of the pneumatic tire which is not provided with either the radial protrusions 60 or the circular circumferential protrusion 100 (Comparative Example 1 described above) is set to "100". The heat transfer coefficient measuring tests were conducted under the following conditions.

Tire Size: 285/50R20
Wheel Size: 8JJ×20
Internal Pressure Condition: 0 kPa (flat)
Load Condition: 0.5 kN
Speed Condition: 90 km/h As FIG. 23 shows, the heat transfer coefficient is high when the ratio of the pitch P of the radial protrusions to the radial-protrusion height h (p/h) is 1.0 to 50.0. When p/h is 2.0 to 24.0, the heat transfer coefficient is even higher. This shows that the radial protrusions should be provided with a relation of $1.0 \leq p/h \leq 50.0$. The graph shows that it is particularly preferable to provide the radial protrusions with a relation of $2.0 \leq p/h \leq 24.0$, or even more preferably, with a relation of $10.0 \leq p/h \leq 20.0$.

FIG. 24 shows that, based on the relation between (p-w)/w and the heat transfer coefficient (measured in the same manner as that for the above heat transfer coefficient), the radial protrusions should be provided with a relation of $1.0 \leq (p-w)/w \leq 100.0$. The graph shows that it is particularly preferable to provide the radial protrusions with a relation of $4.0 \leq (p-w)/w \leq 39.0$.

FIG. 25 shows that it is preferable to provide the radial protrusions so that the extending direction angle (θ) may be within a range of 0 to 70°. Note that similar heat transfer coefficient should be obtained even when the extending direction angle (θ) is set within a range of 0 to −70°.

Note that the entire content of Japanese Patent Application No. 2008-120787 (filed on May 2, 2008) is incorporated herein by reference.

[Industrial Applicability]

As described above, the pneumatic tire according to the present invention can sufficiently suppress the temperature rise in the tire side potions, and is therefore useful in a technique for manufacturing pneumatic tires, and the like.

[Reference Signs List]

1 . . . pneumatic tire, 10 . . . bead portion, 10a . . . bead core, 10b . . . bead filler, 20 . . . carcass layer, 30 . . . tire side portion, 31 . . . tire surface, 40 . . . side reinforcing layer, 50 . . . inner liner, 60 . . . radial protrusion, 60A . . . top face, 61 . . . inner end portion, 62 . . . outer end portion, 62A . . . end face, 70 . . . rim guard, 80 . . . tread portion, 81 . . . tread shoulder, 90A . . . first belt layer, 90B . . . second belt layer, 100 . . . circular circumferential protrusion, 101 . . . inner face, 102 . . . outer face

The invention claimed is:

1. A run-flat tire comprising a plurality of radial protrusions each extending in a tire radial direction on a tire surface and having a shape protruding from the tire surface outward in a tire width direction, wherein
the plurality of radial protrusions are provided radially with a tire rotation axis as a center,
the plurality of radial protrusions each have an outer end portion being an end portion located on an outer side in the tire radial direction and an inner end portion that continues smoothly into a rim guard, and
the outer end portion is provided to the tire surface in a tire maximum width portion in the tire width direction,
wherein a width of the tire maximum width portion measured in the tire radial direction is within a range of 10 mm on each of outer and inner sides, in the tire radial direction, of a tire maximum width point, and
wherein the plurality of radial protrusions have a relation of $1.0 \leq p/h \leq 50.0$ and $1.0 \leq (p-w)/w \leq 100.0$, where "h" is a maximum height of each radial protrusion measured in the tire width direction, "w" is a width of each radial protrusion measured in a direction perpendicular to the tire radial direction, and "p" is a pitch between the adjacent radial protrusions,
the rim guard extending along a circumference which has the tire rotation axis as a center, and protruding outwardly in the tire width direction arranged on an exterior surface of a bead portion included in the tire, for the purpose of preventing at least one of the tire and a rim from being damaged due to a contact with obstacles,
an inner end portion of the rim guard, located on an inner side in the tire radial direction, continues smoothly into the exterior surface of the bead portion
wherein a smooth surface is formed over an entire area between each of the adjacent radial protrusions on the tire surface.

2. The run-flat tire according to claim 1, further comprising a circular circumferential protrusion extending along a circumference which has the tire rotation axis as a center and having a shape protruding outward in the tire width direction, wherein
the circular circumferential protrusion is provided in the tire maximum width portion.

3. The run-flat tire according to claim 2, wherein a height of the circular circumferential protrusion measured in the tire width direction is 0.2 times to 1.5 times, both inclusive, of a maximum height of each of the plurality of radial protrusions measured in the tire width direction.

4. The run-flat tire according to claim 2, wherein a width of the circular circumferential protrusion measured in the tire radial direction is 2 mm to 22 mm, both inclusive.

5. The run-flat tire according to claim 1, wherein
the outer end portion has an end face on the outer side in the tire radial direction, and
the end face forms an angle larger than 0° but not exceeding 90° with respect to the tire surface.

6. The run-flat tire according to claim 1, wherein a height of the outer end portion measured in the tire width direction decreases toward the outer side in the tire radial direction.

7. The run-flat tire according to claim 1, wherein the plurality of radial protrusions have a relation of $2.0 \leq p/h \leq 24.0$ and $4.0 \leq (p-w)/w \leq 39.0$.

8. The run-flat tire according to claim 7, wherein the plurality of radial protrusions have a relation of $10.0 \leq p/h \leq 20.0$ and $4.0 \leq (p-w)/w \leq 39.0$.

9. The run-flat tire according to claim 1, wherein the radial protrusions are formed with a constant pitch in a tire circumferential direction.

10. The run-flat tire according to claim 1, wherein all the radial protrusions extend in a same direction with respect to the tire radial direction.

* * * * *